United States Patent
Kumabe

(10) Patent No.: US 11,963,090 B2
(45) Date of Patent: Apr. 16, 2024

(54) COMMUNICATION CONTROL DEVICE, TERMINAL DEVICE, COMMUNICATION CONTROL METHOD, AND CONTROL PROGRAM

(71) Applicant: DENSO CORPORATION, Kariya (JP)

(72) Inventor: Seigou Kumabe, Kariya (JP)

(73) Assignee: DENSO CORPORATION, Kariya (JP)

( * ) Notice: Subject to any disclaimer, the term of this patent is extended or adjusted under 35 U.S.C. 154(b) by 350 days.

(21) Appl. No.: 17/387,096

(22) Filed: Jul. 28, 2021

(65) Prior Publication Data

US 2021/0360516 A1    Nov. 18, 2021

Related U.S. Application Data

(63) Continuation of application No. PCT/JP2019/051053, filed on Dec. 26, 2019.

(30) Foreign Application Priority Data

Jan. 31, 2019   (JP) .................................. 2019-015243

(51) Int. Cl.
*H04W 48/16*     (2009.01)
*H04W 8/00*      (2009.01)

(52) U.S. Cl.
CPC .......... *H04W 48/16* (2013.01); *H04W 8/005* (2013.01)

(58) Field of Classification Search
CPC ..... H04W 76/14; H04W 8/005; H04W 24/02; H04W 48/16; H04W 56/00; H04W 72/04; H04W 72/0446; H04W 74/006; H04W 76/28; H04W 92/18
See application file for complete search history.

(56) References Cited

U.S. PATENT DOCUMENTS

| | | | |
|---|---|---|---|
| 9,338,808 B2* | 5/2016 | Kim ..................... | H04W 8/005 |
| 2014/0140286 A1* | 5/2014 | Kim ..................... | H04W 8/005 |
| | | | 370/328 |
| 2015/0098422 A1* | 4/2015 | Sartori ................ | H04W 72/569 |
| | | | 370/329 |
| 2016/0169688 A1* | 6/2016 | Kweon ............ | G08G 1/096741 |
| | | | 701/522 |
| 2016/0219443 A1* | 7/2016 | Lee ...................... | H04W 24/02 |

(Continued)

FOREIGN PATENT DOCUMENTS

JP    2018026736 A    2/2018

*Primary Examiner* — Matthew C Sams
(74) *Attorney, Agent, or Firm* — Harness, Dickey & Pierce, P.L.C.

(57) ABSTRACT

A communication control device used in a terminal device that performs mobile communication is provided. The communication control device controls a communication module of the terminal device to perform direct communication with a different terminal device not via a base station. The communication control device manages whether the communication module is in a search mode or a communication mode, and determines, using information managed, whether a transmission timing of a signal from the communication module determined in accordance with occurrence timing of a transmission event overlaps the search mode. When determining that the transmission timing overlaps the search mode, the communication control device shifts the transmission timing out of the time duration of the search mode.

7 Claims, 8 Drawing Sheets

(56) References Cited

U.S. PATENT DOCUMENTS

2017/0027013 A1\* 1/2017 Kim .................... H04W 52/383
2017/0150501 A1\* 5/2017 Park .................. H04W 72/0446
2019/0208504 A1   7/2019 Yasukawa et al.
2021/0360516 A1\* 11/2021 Kumabe ................. H04M 1/00

\* cited by examiner

COMMUNICATION CONTROL DEVICE, TERMINAL DEVICE, COMMUNICATION CONTROL METHOD, AND CONTROL PROGRAM

CROSS REFERENCE TO RELATED APPLICATIONS

This application is a continuation application of PCT/JP2019/051053 filed on Dec. 26, 2019, which designated the U.S and claims the benefit of priority from Japanese Patent Application No. 2019-15243 filed on Jan. 31, 2019. The entire disclosures of all of the above applications are incorporated herein by reference.

FIELD

The present disclosure relates to a communication control device, a terminal device, a communication control method, and a control program.

BACKGROUND

A Device to Device (D2D) technology is known for mobile communication performable terminal devices to directly perform wireless communication therebetween not via a base station. In a rough sense, the D2D is divided into "Discovery" in which a different terminal device communicable is searched for, and "Communication" in which the communication is performed. The D2D implements the direct wireless communication between the terminal devices while periodically switching between a discovery mode and a communication mode, wherein the discovery mode is a time duration for execution of the Discovery and the communication mode is a time duration for execution of the Communication. In the discovery mode, the terminal device cannot perform communication.

SUMMARY

The present disclosure provides a communication control device, a terminal device, a communication control method, and a control program.

In an aspect of the present disclosure, a communication control device controls a communication module included in a terminal device to perform direct communication with a different terminal device not via a base station. The communication control device determines whether or not a transmission timing of a signal from the communication module determined in accordance with occurrence timing of a transmission event a time duration of a search mode. When determining that the transmission timing overlaps the time duration of the search mode, the communication control device shifts the transmission timing out of the time duration of the search model.

In an aspect of the present disclosure, a terminal device is capable of performing direct wireless communication with a different terminal device not via a base station. The terminal device determines whether or not a transmission timing of a signal from a communication module of the terminal device determined in accordance with an occurrence timing of a transmission event overlaps a time duration of a search mode. When the terminal device determines that the transmission timing overlaps the time duration of the search mode, the terminal device shifts the transmission timing out of the time duration of the search mode.

In an aspect of the present disclosure, a communication control method controls a communication module included in a terminal device to perform direct communication with a different terminal device not via a base station. The communication control method comprises determining whether or not a transmission timing of a signal from the communication module determined in accordance with an occurrence timing of a transmission event overlaps a time duration of a search mode; and when determining that the transmission timing overlaps the time duration of the search mode, shifting the transmission timing out of the time duration of the search mode.

In an aspect of the present disclosure, a control program causes a computer to function as a communication control device that controls a communication module of a terminal device to perform direct wireless communication with a different terminal device not via a base station. The control program causes the computer to perform: determining whether or not a transmission timing of a signal from the communication module determined in accordance with an occurrence timing of a transmission event overlaps a time duration of a search mode; when determining that the transmission timing overlaps the time duration of the search mode, shifting the transmission timing out of the time duration of the search mode.

BRIEF DESCRIPTION OF DRAWINGS

Objects, features and advantages of the present disclosure will become more apparent from the following detailed description made with reference to the accompanying drawings. In the drawings.

DETAILED DESCRIPTION

Figure 1:
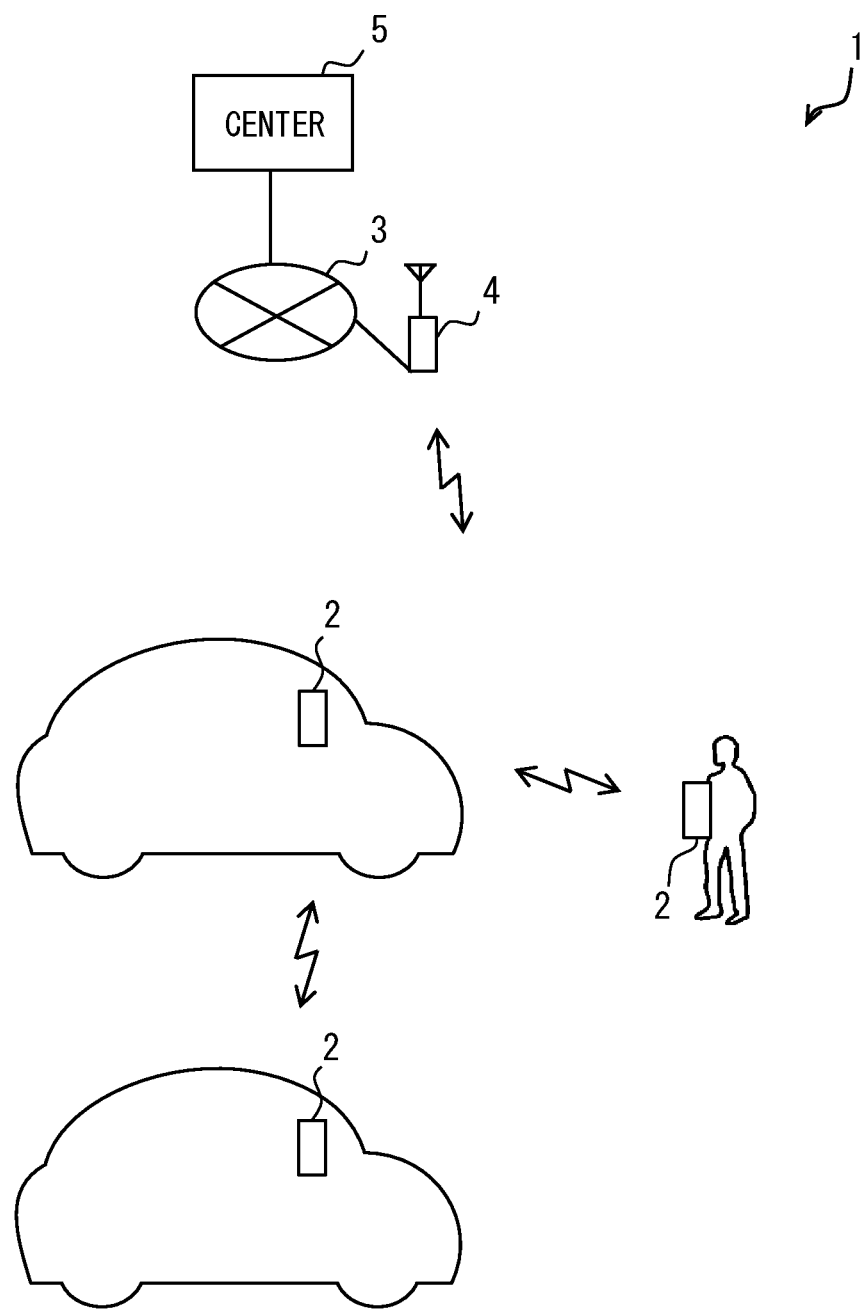
FIG. 1 is a diagram showing an example of a schematic configuration of a communication system.

For example, there is a D2D related technology of performing sensing during a time duration of a sensing window corresponding to the discovery mode to recognize how a future resource to be used by another user device at the time of transmission is reserved, and to select a resource to be used by a host device at the time of transmission. This is to suppress collisions of signals transmitted by devices. The resource include time, frequency, and the like.

The above technology takes into account suppressing collisions of signals transmitted in the communication mode by using resources selected within the time duration of the sensing window (that is, in the discovery mode). However, the technology fails to address a case where, depending on the occurrence timing of a transmission event to be transmitted, a signal transmission timing may overlap the discovery mode. Therefore, when the transmission timing overlaps the discovery mode, there arises such a problem that a signal to be transmitted cannot be transmitted.

Examples of the case where the transmission timing overlaps the discovery mode include a case where the period of switching between the discovery mode and the communication mode is deviated from the period of periodic transmission events and due to this deviation, part of the transmission timing overlaps the discovery mode. In another example, a transmission event occurs due to an interrupt, and the transmission timing for this transmission event may overlap the discovery mode.

An object of the present disclosure is to provide a communication control device, a terminal device, a communication control method, and a control program that can suppress, in a mobile communication performable terminal device, an occurrence of a situation where a signal to be transmitted cannot be transmitted.

A communication control device in an example of the present disclosure is used in a terminal device that performs mobile communication, and the communication control device controls a communication module included in the terminal device to perform direct communication with a different terminal device not via a base station, the communication control device comprising: a mode management unit that manages whether the communication module is in a search mode for searching for the different terminal device communicable or a communication mode for performing communication; a contention determination unit that, using information managed by the mode management unit, determines whether or not a transmission timing of a signal from the communication module determined in accordance with occurrence timing of a transmission event to be transmitted from the communication module overlaps a time duration of the search mode; and a transmission control unit that, based on determining by the contention determination unit that the transmission timing does not overlap the time duration of the search mode, causes the communication module to transmit the signal at this transmission timing, and when determining that the transmission timing overlaps the time duration of the search mode, shifts the transmission timing out of the time duration of the search mode and causes the communication module to transmit the signal.

A terminal device in an example of the present disclosure performs mobile communication, and comprises: a communication module that is capable of performing direct wireless communication with a different terminal device not via a base station, the different terminal device being other than the terminal device; and a communication control device that controls the communication module, wherein the communication control device includes: a mode management unit that manages whether the communication module is in a search mode for searching for the different terminal device communicable or a communication mode for performing communication; a contention determination unit that, using information managed by the mode management unit, determines whether or not a transmission timing of a signal from the communication module determined in accordance with an occurrence timing of a transmission event to be transmitted from the communication module overlaps a time duration of the search mode; and a transmission control unit that, based on determining by the contention determination unit that the transmission timing does not overlap the time duration of the search mode, causes the transmission module to transmit the signal at this transmission timing, and when the contention determination unit determines that the transmission timing overlaps the time duration of the search mode, shifts the transmission timing out of the time duration of the search mode and causes the communication module to transmit to the signal.

A communication control method in an example of the present disclosure is used in a terminal device that performs mobile communication, and the communication control method controls a communication module included in the terminal device to perform direct communication with a different terminal device not via a base station, the different terminal device being other than the terminal device, the communication control method comprising: managing whether the communication module is in a search mode for searching for the different terminal device communicable or a communication mode for performing communication; by using information managed, determining whether or not a transmission timing of a signal from the communication module determined in accordance with an occurrence timing of a transmission event to be transmitted from the communication module overlaps a time duration of the search mode; based on determining that the transmission timing does not overlap the time duration of the search mode, casing the communication module to transmit the signal at this transmission timing; and when determining that the transmission timing overlaps the time duration of the search mode, shifting the transmission timing out of the time duration of the search mode and causing the communication module to transmit the signal.

A control program in an example of the present disclosure causes a computer to function as a communication control device that is used in a terminal device which performs mobile communication, and that controls a communication module included in the terminal device to perform direct wireless communication with a different terminal device not via a base station, the control program causing the computer to perform: managing whether the communication module is in a search mode for searching for the different terminal device communicable or a communication mode for performing communication; by using information managed, determining whether or not a transmission timing of a signal from the communication module determined in accordance with an occurrence timing of a transmission event to be transmitted from the communication module overlaps a time duration of the search mode; based on determining that the transmission timing does not overlap the time duration of the search mode, casing the communication module to transmit the signal at this transmission timing; and when determining that the transmission timing overlaps the time duration of the search mode, shifting the transmission timing out of the time duration of the search mode and causing the communication module to transmit the signal.

With the above configurations, since it is managed whether the communication module is in the search mode for searching for a different terminal device communicable or the communication mode for performing communication, it becomes possible to determine, by using the managed information, whether or not the transmission timing of the signal from the communication module determined in accordance with the occurrence timing of the transmission event to be transmitted from the communication module overlaps the time duration of the search mode. Based on determining that the transmission timing does not overlap the time duration of the search mode, the signal is transmitted from the communication module at the transmission timing, so that it becomes possible to transmit the signal at a timing that does not overlap the time duration of the search mode. When it is determined that the transmission timing overlaps the time duration of the search mode, the signal is transmitted from the communication module at the transmission timing shifted out of the time duration of the search mode, so that the signal can be transmitted at a timing that does not overlap the time duration of the search mode. As a result, in the terminal device capable of the mobile communication, it is possible to suppress the occurrence of a situation in which a signal to be transmitted cannot be transmitted.

Embodiments of the present disclosure will be described with reference to the drawings. For the sake of convenience of description, the same reference signs are given to the parts having the same functions as those shown in the drawings used for the description so far among the embodiments, and description thereof may be omitted. The description of other embodiments can be referred to for portions to which the same reference signs are assigned.

Embodiment 1

<Schematic Configuration of Communication System 1>

Hereinafter, Embodiment 1 of the present disclosure will be described with reference to the drawings. As shown in FIG. 1, a communication system 1 includes a terminal device 2, a cellular phone communication network 3, a base station 4, and a center 5.

The terminal device 2 is a terminal device that performs mobile communication. The terminal device 2 may be an in-vehicle device mounted on a vehicle, or may be a mobile terminal such as a cellular phone carried by a user such as a pedestrian. When the terminal device 2 is used in a vehicle, it may be mounted on the vehicle and used, or may be temporarily brought into the vehicle and used by a user. The details of the terminal device 2 will be described later.

The cellular phone communication network 3 is one kind of mobile communication network, and is a communication network mainly used for voice communication and Internet communication. The terminal device 2 that can use the cellular phone communication network 3 is not limited to a cellular phone. The base station 4 is a facility that wirelessly communicates with the terminal device 2 at an end of the cellular phone communication network 3.

The center 5 is a server device, and receives information transmitted from the terminal device 2 via the cellular phone communication network 3 and the base station 4. In the present embodiment, the description will be given by taking as an example a case where the center 5 receives information on an emergency situation occurring on a vehicle, which is transmitted from the terminal device 2 used in the vehicle when the emergency situation occurs in the vehicle. The center 5 may include a single server device or a plurality of server devices.

The terminal device 2 can perform communication with a different terminal devices 2 (hereinafter, different terminal devices) other than the host device and the center 5, via the cellular phone communication network 3 and the base station 4 (hereinafter, indirect communication). In addition, the terminal device 2 can directly perform wireless communication (hereinafter, referred to as "direct communication") with a different terminal devices not via the cellular phone communication network 3 nor the base station 4. This direct communication is so-called D2D. As an example, the direct communication may be a communication standardized by cellular V2X, or a communication standardized by Long Term Evolution (LTE) Direct. In the following description, a case where the direct communication is the communication standardized by LTE Direct will be described as an example.

In the direct communication, terminal-to-terminal communication is implemented alternately switching between a Discovery mode (hereinafter, D-mode) for searching for a different terminal device communicable and a Communication mode (hereinafter, C-mode) for performing communication. The D-mode corresponds to a search mode, and the C-mode corresponds to a communication mode. For example, in the D-mode, sensing is performed to search for a frequency band in which communication with a different terminal device is possible, by searching for a frequency band in which radio waves are receivable from the different terminal device. In the C-mode, the communication is performed at the frequency found in the D-mode as a frequency in which the communication with the different terminal device is possible. In the D-mode, sensing for detecting another resource such as a time and a frequency reserved by a different terminal device may be performed to select the resource to be used for the communication in the C-mode.

In the direct communication, the D-mode and the C-mode are periodically switched alternately. As an example of the present embodiment, it is assumed that a period set as a period of switching between the D-mode and the C-mode (hereinafter, a set period is 64 msec for a time duration of the D-mode and 10 sec for a time duration of the C-mode). The set period is not necessarily fixed and set, but may be adjusted and/or reset.

<Schematic Configuration of Terminal Device 2>

Figure 2:
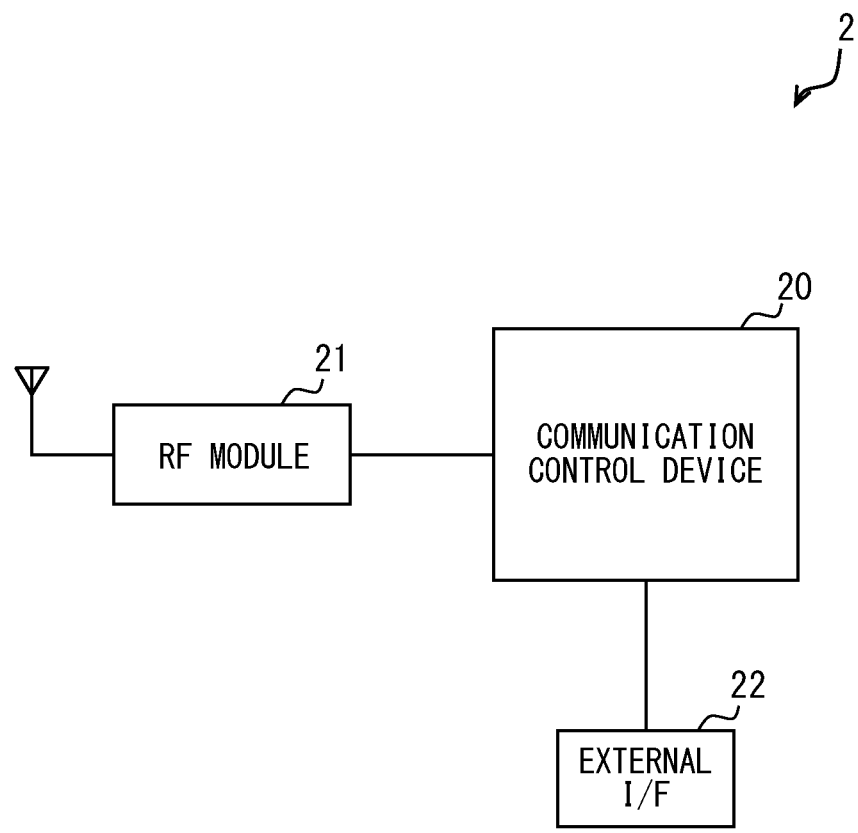
FIG. 2 is a diagram showing an example of a schematic configuration of a terminal device.

Next, an example of a schematic configuration of the terminal device 2 will be described with reference to FIG. 2. Here, an example in which the terminal device 2 is used in an automobile will be described. As shown in FIG. 2, the terminal device 2 includes a communication control device 20, an RF module 21, and an external interface (external I/F) 22.

The Radio Frequency (RF) module 21 is a communication module having a function of performing the indirect communication and a function of the performing direct communication. That is, the RF module 21 is a communication device able to perform the indirect communication and the direct communication. As an example, the RF module 21 may be configured to be able to perform the direct communication using an LTE communication system by performing communication standardized by LTE Direct, as well as perform the indirect communication using an LTE communication system.

The RF module 21 includes an RF antenna to transmit and receive radio waves in the RF band. The RF band is a frequency band of 300 kHz to 3 THz. The RF module 21 demodulates the signal received by the RF antenna, and outputs the demodulated data to the communication control device 20. In addition, the RF module 21 transmits a signal obtained by performing modulation or the like on data output from the communication control device 20 onto a radio wave in an RF band, from the RF antenna. When the RF module 21 performs the direct communication, as described above, the RF module 21 performs communication with a different terminal device while alternately switching between the D-mode and the C-mode at the set periods.

The external I/F 22 is connected, via an in-vehicle LAN, to an ECU, a navigation apparatus, a vehicle sensor, and the like mounted on a vehicle in which the terminal device 2 is used. For example, the external I/F 22 receives an input of a signal from an air-bag sensor, or receives an input of a signal indicating the occurrence of sudden brake from an ECU of a driver-assistance system.

The communication control device 20 includes, for example, a processor, a memory, an I/O, and a bus connecting these components, and executes various processes related to wireless communication by executing a control program stored in the memory. The communication control device 20 controls the RF module 21 and generates data to be transmitted from the RF module 21. There is a variety of processing related to the wireless communication, including processing related to a signal transmission from the RF module 21 of a signal with a shifted period of the D-mode. Execution of steps of this processing by the computer corresponds to execution of a communication control method. The memory referred to is a non-transitory tangible storage medium storing computer readable program and data in a non-transitory manner. The non-transitory tangible storage medium is implemented by a semiconductor memory, a magnetic disk, or the like. Details of the communication control device 20 will be described below.

<Schematic Configuration of the Communication Control Device 20>

Figure 3:
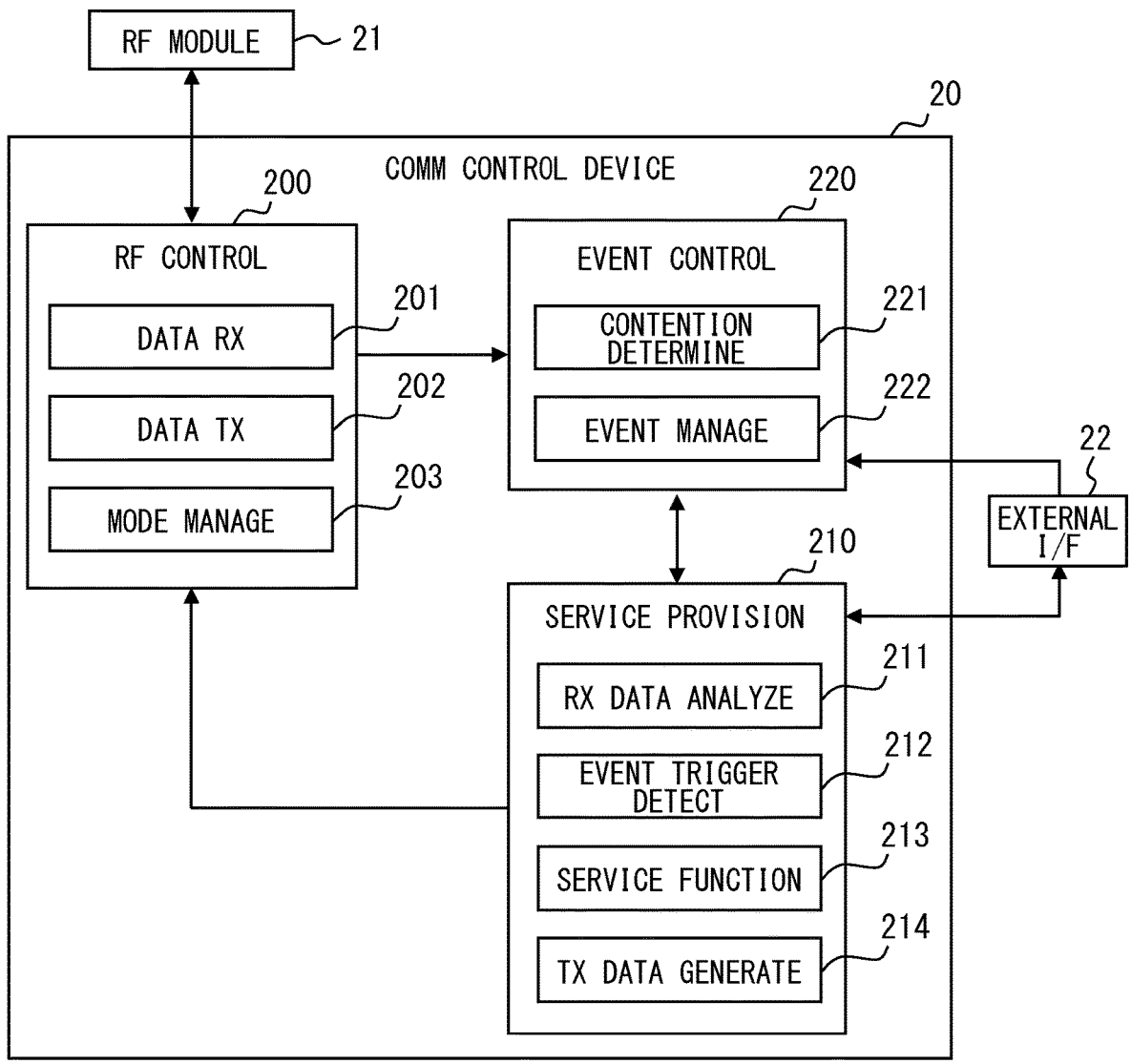
FIG. 3 is a diagram showing an example of a schematic configuration of a communication control device.

Next, a schematic configuration of the communication control device 20 related to the direct communication will be described. As shown in FIG. 3, the communication control device 20 includes an RF control unit 200, a service providing unit 210, and an event control unit 220 as functional blocks. Note that part or all of the functions executed by the communication control device 20 may be provided by hardware using one or more ICs or the like. Part or all of the functional blocks included in the communication control device 20 may be implemented by a combination of processor-executable software and hardware.

The RF control unit 200 includes a data receiving unit 201, a data transmission unit 202, and a mode management unit 203 as sub-functional blocks. The service providing unit 210 includes a reception data analysis unit 211, an event trigger detection unit 212, a service function unit 213, and a transmission data generation unit 214 as sub-functional blocks. The event control unit 220 includes a contention determination unit 221 and an event management unit 222 as sub-functional blocks.

The data receiving unit 201 acquires reception data obtained by demodulating a signal received by the RF module 21, which reception data is output from the RF module 21. The data receiving unit 201 supplies to the service providing unit 210 the reception data acquired from the RF module 21.

The data transmission unit 202 outputs to the RF module 21 the transmission data transmitted from the service providing unit 210 in accordance with the data transmission request from the service providing unit 210. In the RF module 21, when the transmission data is output from the data transmission unit 202, the signal of the transmission data is promptly transmitted from the RF antenna. The data transmission unit 202 corresponds to a transmission control unit.

The mode management unit 203 manages whether the RF module 21 is in the D-mode or the C-mode. In other words, the mode management unit 203 specifies whether the current mode of the RF module 21 is the D-mode or the C-mode. For example, at a time of switching from the D-mode to the C-mode, the mode management unit 203 stores first and second information items in the memory in association with each other as current mode information, wherein the first information items is a system clock time at this time point and the second information item is information indicating that the C-mode is the current mode. The system clock time of switching from the D-mode to the C-mode corresponds to a start time of the C-mode. At a time of switching from the C-mode to the D-mode, the mode management unit 203 stores first and second information items in the memory in association with each other as the current mode information, wherein the first information item is a system clock time at this time point and the other of the information items is information indicating that the D-mode is the current mode. The system clock time of switching from the C-mode to the D-mode corresponds to a start time of the D-mode. The current mode information is updated each time new current mode information is newly acquired.

In cases where a notification indicating switching between the D-mode and the C-mode is acquirable from the RF module 21, the mode management unit 203 may specify the time of switching between the D-mode and the C-mode based on the notification. Further, even in cases of a configuration in which the notification indicating the switching between the D-mode and the C-mode is not acquirable from the RF module 21, the mode management unit 203 may specify the time of switching between the D-mode and the C-mode based on the timings of starting and ending the sensing, by acquiring the sensing result from the RF module 21.

Figure 4:
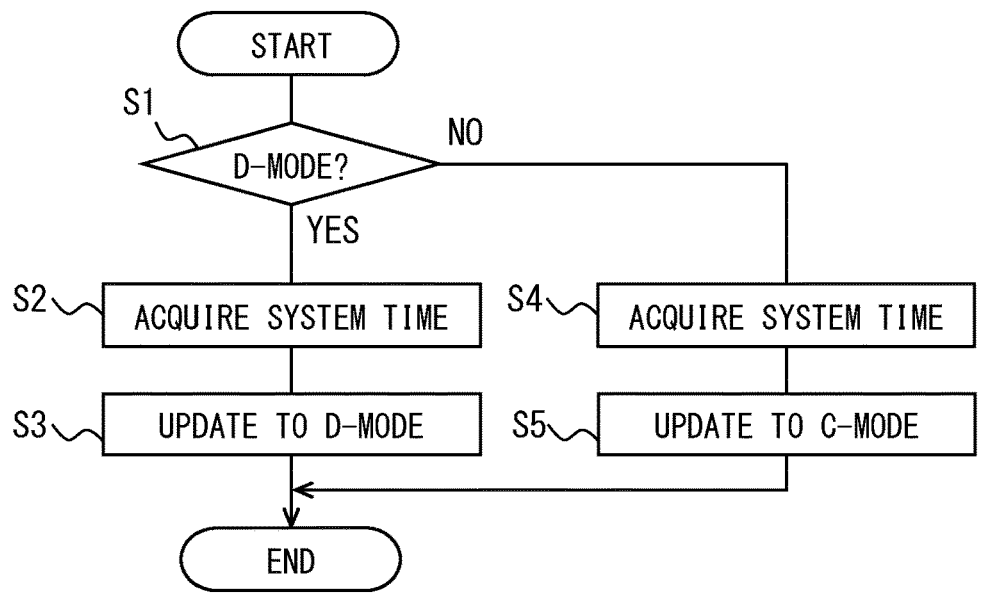
FIG. 4 is a flowchart showing an example of a flow of processes in a mode management unit.

Now, an example of the flow of processing in the mode management unit 203 will be described with reference to the flowchart of FIG. 4. For example, the process of the flowchart of FIG. 4 may be configured to start each time the switching between the D-mode and the C-mode is specified.

When the current mode of the RF module 21 is specified as the D-mode (YES in S1), the process proceeds to step S2. On the other hand, when the current mode of the RF module 21 is specified as the C-mode (NO in S1), the process proceeds to step S4.

In step S2, the system time is acquired. In step S3, the current mode in the current mode information in which the current mode and the time stamp are associated with each other is updated to the D-mode and the time stamp in the current mode information is updated to the system time acquired in step S2, and the process of the flowchart of FIG. 4 is ended.

In step S4, the system time is acquired. In step S5, the current mode in the current mode information is updated to the C-mode and the time stamp in the current mode information is updated to the system time acquired in step S4, and the process of the flowchart of FIG. 4 is ended.

The reception data analysis unit 211 analyzes the reception data supplied from the data receiving unit 201, and sends the analyzed reception data to the service function unit 213.

The event trigger detection unit 212 detects a trigger of a transmission event to be transmitted from the RF module 21 (hereinafter, referred to as the event trigger). When the event trigger is detected, the event trigger detection unit 212 causes the service function unit 213 to operate.

In the present embodiment, the below description will be given on assumption that transmission events include a periodic transmission event and a sudden transmission event. In a configuration of other embodiments, either the periodic transmission event or the sudden transmission event may exist as the transmission events. In this case, of the processing related to the related to the periodic transmission event and the processing related to the sudden transmission event, the processing related to the not existing transmission event may be omitted.

The event trigger detection unit 212 may be configured to detect the event trigger for each preset period of the periodic transmission events, by a timer circuit incorporated in the communication control device 20. An example of the periodic transmission event is transmission of the current position of the host vehicle. The event trigger detection unit 212 notifies the event control unit 220 of the time of the next transmission event (hereinafter, referred to as the next cycle event time), based on a preset period (cycle) of the periodic transmission event. In an example, the preset period of the periodic transmission event is 100 msec or the like.

With regard to the sudden transmission event, the event trigger detection unit 212 may detect as the event trigger a predetermined signal input via the external I/F 22. Examples of the predetermined signal include a signal indicating sudden brake of the host vehicle, a signal indicating operation of an air-bag of the host vehicle, and the like. The sudden transmission event includes a transmission event for transmitting information on an emergency situation occurring on the host vehicle. Examples include a transmission event for transmitting information indicating sudden brake of the host vehicle, a transmission event for transmitting information indicating that the host vehicle is inoperable, and the like. Further, the event trigger detection unit 212 also detects as an event trigger an event notification from the event management unit 222 described later.

The service function unit 213 starts operating by the event trigger detection unit 212 detecting the event trigger, and performs a process necessary for a service to be provided by the transmission event corresponding to the event trigger. For example, when the transmission event is the transmission of the current position of the host vehicle, the current position of the host vehicle may be acquired from the navigation apparatus or the like. When the transmission event is a transmission event for transmitting information indicating sudden brake of the host vehicle, the current position of the host vehicle may be acquired from the navigation apparatus or the like, and/or the acceleration and deceleration of the host vehicle may be acquired from the vehicle sensor. In the case where the transmission event is a transmission event for transmitting information indicating that the host vehicle is inoperable, the current position and the most recent traveling locus of the host vehicle may be acquired from the navigation apparatus or the like.

The transmission data generation unit 214 generates transmission data based on the processing result of the service function unit 213, sends the transmission data to the data transmission unit 202, and requests the data transmission unit 202 to transmit the transmission data. For example, when the transmission event is transmission of the current position of the host vehicle, a data transmission request for transmitting transmission data including the current position of the host vehicle by the direct communication may be made. When the transmission event is transmission of information indicating sudden brake of the host vehicle, a data transmission request for transmitting transmission data including the current position, acceleration and deceleration, and occurrence of sudden brake of the host vehicle by the direct communication may be made. In the case where the transmission event is transmission of information indicating that the host vehicle is inoperable, a data transmission request for transmitting, to the center 5, transmission data including the current position and the most recent traveling locus of the host vehicle by the indirect communication may be made.

The contention determination unit 221 determines whether or not the transmission timing of the signal from the RF module 21, which timing is determined in accordance with the occurrence timing of the transmission event to be transmitted from the RF module 21, overlaps the time duration of the D-mode, by using the information managed by the mode management unit 203. The occurrence timing of the transmission event may be the timing of detection of the event trigger by the event trigger detection unit 212. The contention determination unit 221 may specify the transmission timing of the signal from the RF module 21, by adding a time difference (hereinafter, referred to as a processing time difference) caused by the processes by the service function unit 213 and the transmission data generation unit 214 to the time point of the event trigger detection by the event trigger detection unit 212. The processing time difference may be determined in advance as a function of the type of the transmission event, or may be a fixed value irrespective of the type of the transmission event.

The timing at which the transmission data generation unit 214 issues the data transmission request may be the transmission timing of the signal from the RF module 21. Further, the processing time difference may be assumed to be 0, and the occurrence timing of the transmission event may be used as the transmission timing of the signal from the RF module 21.

With regard to the periodic transmission event, the contention determination unit 221 determines whether or not the transmission timing of the signal from the RF module 21 (hereinafter, referred to as the next cycle transmission timing) determined in accordance with the next occurrence timing overlaps the time duration of the next D-mode, based on the information managed by the mode management unit 203, the set period, and the next occurrence timing of the periodic transmission event.

Figure 5:
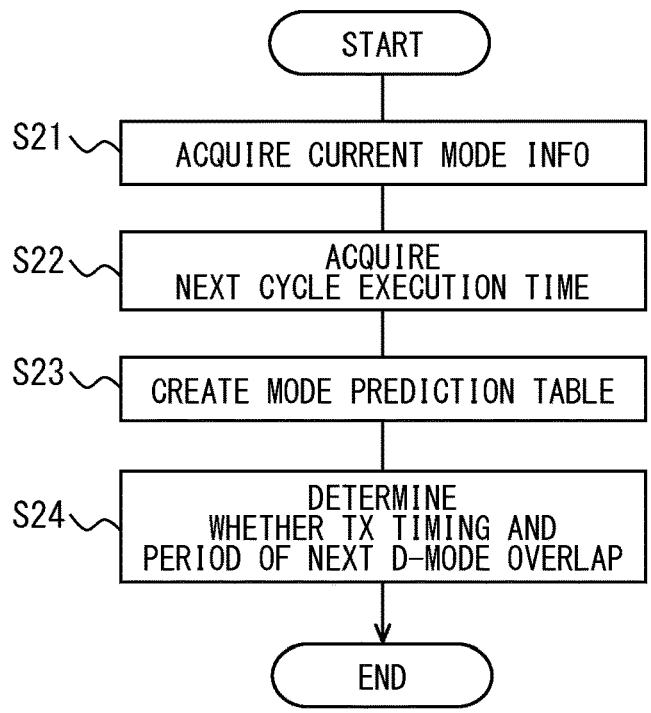
FIG. 5 is a flowchart showing an example of a flow of processes in a contention determination unit for a periodic transmission event.

Here, an example of the flow of processing of the contention determination unit 221 related to the periodic transmission events will be described with reference to the flowchart of FIG. 5. The flow of FIG. 5 may be configured to be performed periodically. The processing of the flowchart of FIG. 5 may be configured to start each time the data transmission unit 202 outputs the transmission data to the RF module 21 in accordance with, for example, the periodic transmission event.

First, in step S21, the current mode information managed by the mode management unit 203 is acquired. In step S22, the next cycle event time provided from the event trigger detection unit 212 is acquired.

Figure 6:
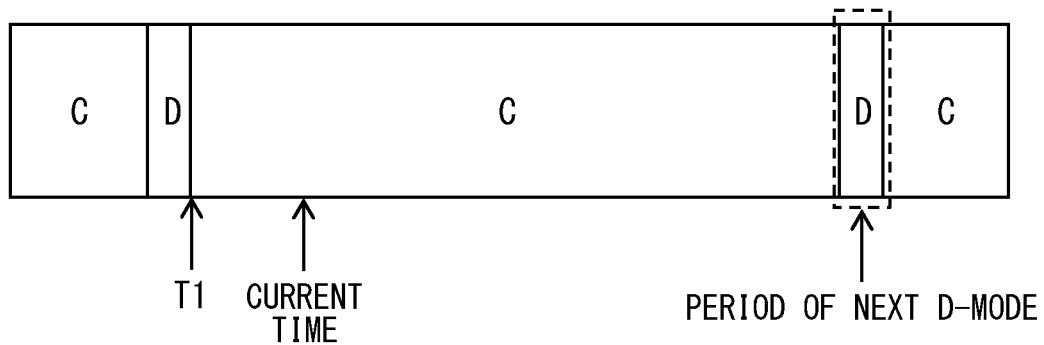
FIG. 6 is a diagram for explaining an example of a mode prediction table.

In step S23, a mode prediction table is created from the current mode information acquired in step S21 and the set period. As shown in FIG. 6, the mode prediction table is a table representing time durations of the D-mode and the C-mode including the current mode. FIG. 6 is a diagram for explaining an example of creation of the mode prediction table. The mode prediction table may be, for example, a table in which, for each time duration of the D-mode and for each time duration of the C-mode, the start time and the end time of the time duration are associated with each other.

Now, an example of the creation of the mode prediction table will be described with reference to FIG. 6. In an example case described below, the current mode is the C-mode and the time stamp is the time T1 in the current mode information. In the example of FIG. 6, since the current mode is the C-mode and the time stamp is the time T1, the start time of the C-mode being the current mode is specified as the time T1. Since the time duration of the C-mode is specifiable as 10 sec from the set period, the time T1+10 sec is specified as the end time of the current mode and the start time of the next D-mode. Further, since the time duration of the D-mode is specifiable as 64 msec from the set period, the time T1+10 sec+64 msec is specified as the end time of the next D-mode and the start time of the next C-mode.

Returning to FIG. 5, in step S24, it is determined whether or not the next cycle transmission timing overlaps the time duration of the next D-mode, and the processing of the flowchart of FIG. 5 is ended. The overlapping of the next cycle transmission timing and the time duration of the next D-mode indicates that the time of the next cycle transmission timing overlaps a duration between the start time and the end time of the time duration of the next D-mode. The next cycle transmission timing may be specified by adding the processing time difference to the next cycle event time acquired in S22. The time duration of the next D-mode may be specified from the mode prediction table created in S23.

With respect to the sudden transmission event, the contention determination unit 221 determines whether or not the transmission timing of the signal from the RF module 21 (hereinafter, referred to as the sudden transmission timing), determined in accordance with the occurrence timing overlaps the time duration of the D-mode, based on the information managed by the mode management unit 203 and on the occurrence timing of the sudden transmission event to be transmitted from the RF module 21.

Now, an example of the flow of processing in the contention determination unit 221 related to the sudden transmission event will be described with reference to the flowchart of FIG. 7. The processing of the flowchart of FIG. 7 may be configured to start upon the event trigger detection unit 212 detecting the event trigger for the sudden transmission event.

First, in step S41, the current mode information managed by the mode management unit 203 is acquired. In step S42, the mode prediction table is created from the current mode information acquired in step S41 and the set period in the same manner as in step S23.

Figure 7:
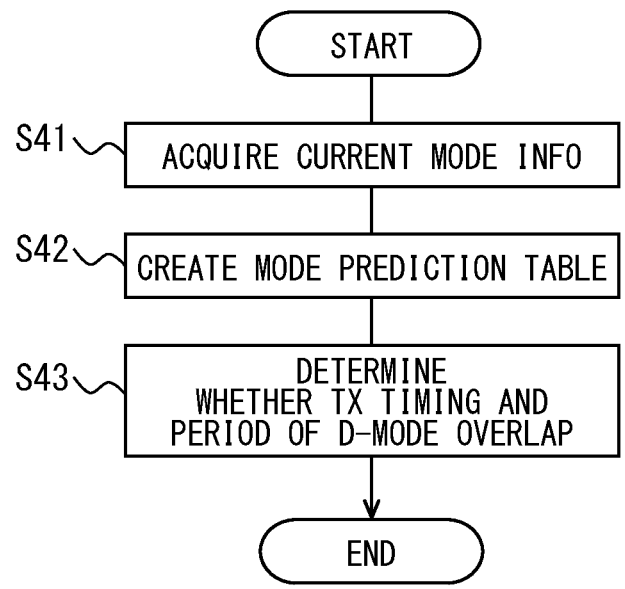
FIG. 7 is a flowchart showing an example of a flow of processes in a contention determination unit for a sudden transmission event.

In step S43, it is determined whether or not the sudden transmission timing and the time duration of the D-mode overlap each other, and the processing of the flowchart of FIG. 7 is ended. The overlapping of the sudden transmission timing and the time duration of the D-mode indicates that the time of the sudden transmission timing overlaps a time between the start time and the end time of the period of the D-mode. The sudden transmission timing may be specified by adding the processing time difference to the current time. The time duration of the D-mode may be specified from the mode prediction table created in S42.

The event management unit 222 provides an event notification to the event trigger detection unit 212, based on the result of determining by the contention determination unit 221. When the contention determination unit 221 determines that the next cycle transmission timing overlaps the time duration of the D-mode, the event management unit 222 performs event notification at a timing obtained by shifting the next cycle transmission timing out of the time duration of the D-mode. On the other hand, when the contention determination unit 221 determines that the next cycle transmission timing does not overlap the time duration of the D-mode, the event management unit 222 does not perform event notification.

Now, an example of the flow of processing of the event management unit 222 related to the periodic transmission events will be described with reference to the flowchart of FIG. 8. The processing of the flowchart of FIG. 8 may be configured to start when the contention determination unit 221 performs a determination with respect to the periodic transmission event whether or not the next cycle transmission timing overlaps the time duration of the D-mode.

First, in step S61, when the contention determination unit 221 determines that the next cycle transmission timing and the time duration of the D-mode overlap each other (YES in S61), the process proceeds to step S62. On the other hand, when the contention determination unit 221 determines that the next cycle transmission timing does not overlap the time duration of the D-mode (NO in S61), the event notification is not performed, and the process of the flowchart of FIG. 8 is ended.

When the event management unit 222 provides no event notification, the event trigger detection unit 212 detects the event trigger of the periodic transmission event at each preset cycle (period) of the periodic transmission event. A signal is transmitted from the RF module 21, in according with this cycle.

In step S62, when the current mode is the C-mode (YES in S62), the process proceeds to step S63. On the other hand, when the current mode is the D-mode (NO in S62), the process proceeds to step S64. Whether the current mode is the C-mode or the D-mode may be determined using the current mode information by the event management unit 222.

Figure 8:
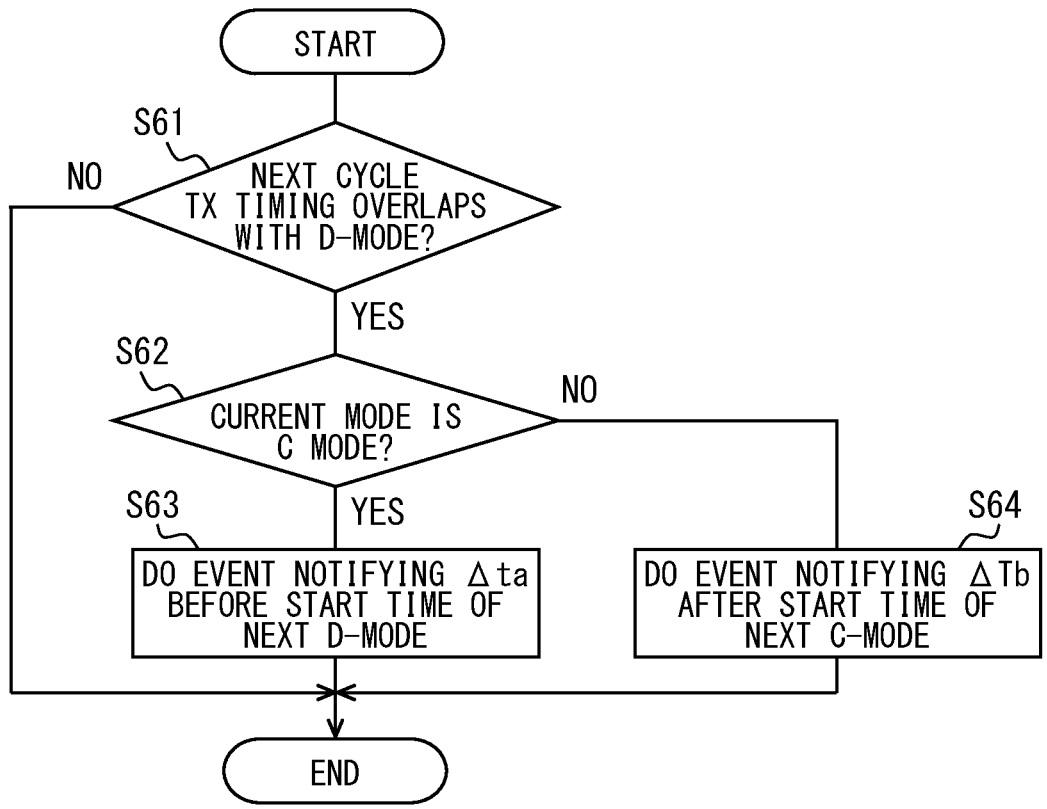
FIG. 8 is a flowchart showing an example of a flow of processes in an event management unit for a periodic transmission event.
Figure 9:
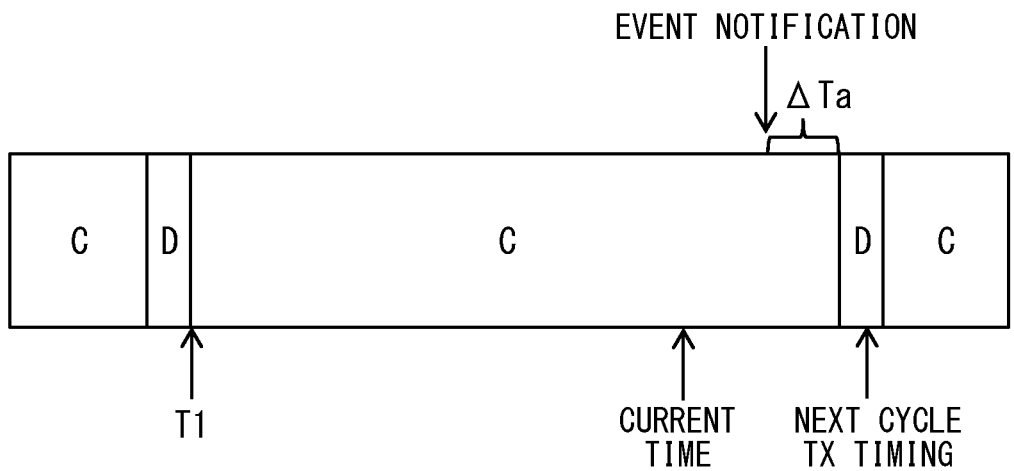
FIG. 9 is a diagram for explaining an example of the timing of event notification in a case where the next cycle transmission timing and the period of the next D-mode overlap and the current mode is a C-mode.

In step S63, as shown in FIG. 9, the event notification is provided to the event trigger detection unit 212 ΔTa [msec] before the start time of the next D-mode, and the process of the flowchart of FIG. 8 is ended. The event management unit 222 may specify the start time of the next D-mode from the mode prediction table created by the contention determination unit 221 and the time stamp of the current mode in the current mode information. ΔTa is a first predetermined time and may be set to any suitable value as long as the time allows, prior to the start time of the next D-mode, the RF module 21 to complete transmitting all packets of signals processed by the service function unit 213 and the transmission data generation unit 214 in accordance with the event notification.

When the next cycle transmission timing overlaps the time duration of the next D-mode overlap, the signal to be transmitted from the RF module 21 in the periodic transmission event may fail to be transmitted in the time duration of the next D-mode. However, with the process of S63, the signal to be transmitted from the RF module 21 due to the periodic transmission event is transmitted within the time interval of the C-mode before the start time of the next D-mode.

Therefore, the signal to be transmitted from the RF module 21 can be transmitted promptly, without waiting for the time duration of the next C-mode. Specifically, since the event management unit 222 provides the event notification while maintaining the periodicity of the periodic transmission event, it is possible that the signal un-transmittable from the RF module 21 within the time duration of the D-mode is transmitted at the transmission timing shifted out of the time duration of the D-mode. In other words, apart from the signal un-transmittable from the RF module 21 within the time duration of the D-mode, the signal to be transmitted from the RF module 21 is transmitted before the time duration of the next D-mode. Therefore, it is possible to transmit the signal to be transmitted from the RF module 21, while suppressing the labor of changing the periodicity of the periodic transmission event every time it overlaps the time duration of the D-mode.

Figure 10:
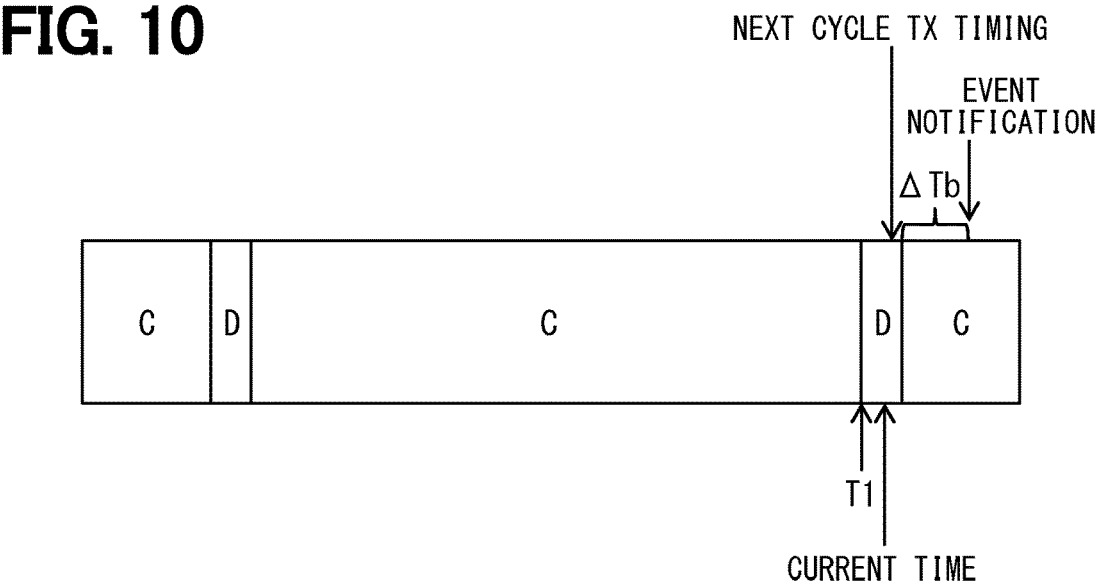
FIG. 10 is a diagram for explaining an example of the timing of event notification when the next cycle transmission timing and the period of a D-mode overlap and the current mode is the D-mode.

In step S64, as shown in FIG. 10, at a time ΔTb [msec] after the start time of the next C-mode, the event notification is provided to the event trigger detection unit 212, and the process of the flowchart of FIG. 8 is ended. The event management unit 222 may specify the start time of the next C-mode, from the mode prediction table created by the contention determination unit 221 and the time stamp of the current mode in the current mode information. ΔTb is a second predetermined time and may be set to any suitable value as long as the time allows completion of switching to the frequency band selected in the D-mode when the mode is switched from the D-mode to the C-mode. ΔTa and ΔTb may be different times or may be the same time.

When the next cycle transmission timing overlaps the time duration of the D-mode being the current mode, the signal to be transmitted from the RF module 21 according to the periodic transmission event fails to be transmitted within the time duration of the D-mode being the current mode. However, with the process of S64, the signal to be transmitted from the RF module 21 in accordance with the periodic transmission event is transmitted within the time duration of the next C-mode. In other words, apart from the signal un-transmittable from the RF module 21 within the time duration of the D-mode, the signal to be transmitted from the RF module 21 is transmitted within the time duration of the next C-mode. Therefore, the signal to be transmitted from the RF module 21 can be transmitted, while suppressing the labor of changing the periodicity of the periodic transmission event every time it overlaps the time duration of the D-mode.

Further, when the contention determination unit 221 determines that the sudden transmission timing overlaps the time duration of the D-mode overlap, the event management unit 222 performs event notification at a timing obtained by shifting the sudden transmission timing shifts out of the time duration of the D-mode. On the other hand, when the contention determination unit 221 determines that the sudden transmission timing does not overlap the period of the D-mode, the event management unit 222 does not perform the event notification.

Now, an example of the flow of processing of the event management unit 222 related to the sudden transmission event will be described with reference to the flowchart of FIG. 11. The processing of the flowchart of FIG. 11 may be configured to start when the contention determination unit 221 performs a determination with respect to a sudden transmission event whether or not the sudden transmission timing and the time duration of the D-mode overlap each other.

First, when in step S81, the contention determination unit 221 determines that the sudden transmission timing and the time duration of the D-mode overlap each other (YES in S81), the process proceeds to step S82. On the other hand, when the contention determination unit 221 determines that the sudden transmission timing does not overlap the time duration of the D-mode (NO in S81), the process proceeds to step S83. It is assumed that when the sudden transmission timing does not overlap the time duration of the D-mode in the contention determination unit 221, the current mode is the C-mode.

Figure 11:
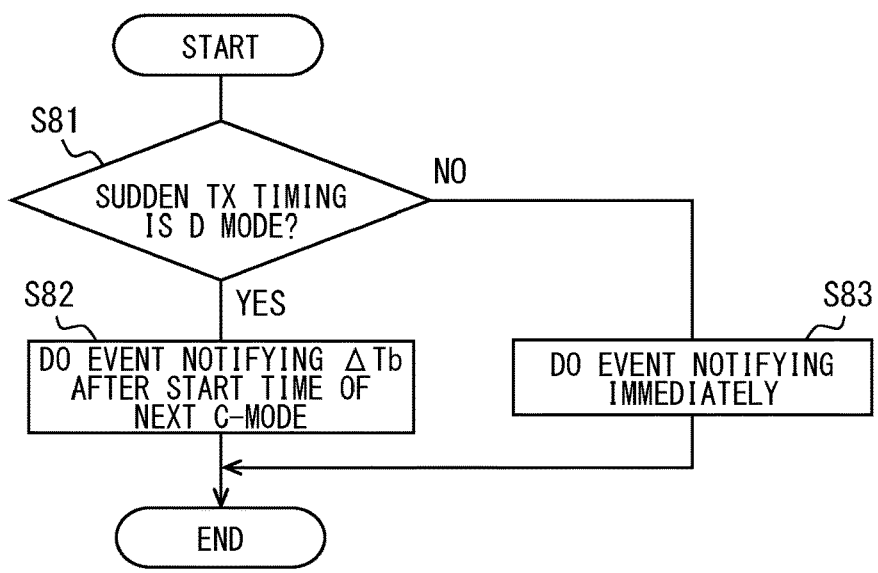
FIG. 11 is a flowchart showing an example of the flow of processing for the sudden transmission event in the event management unit.
Figure 12:
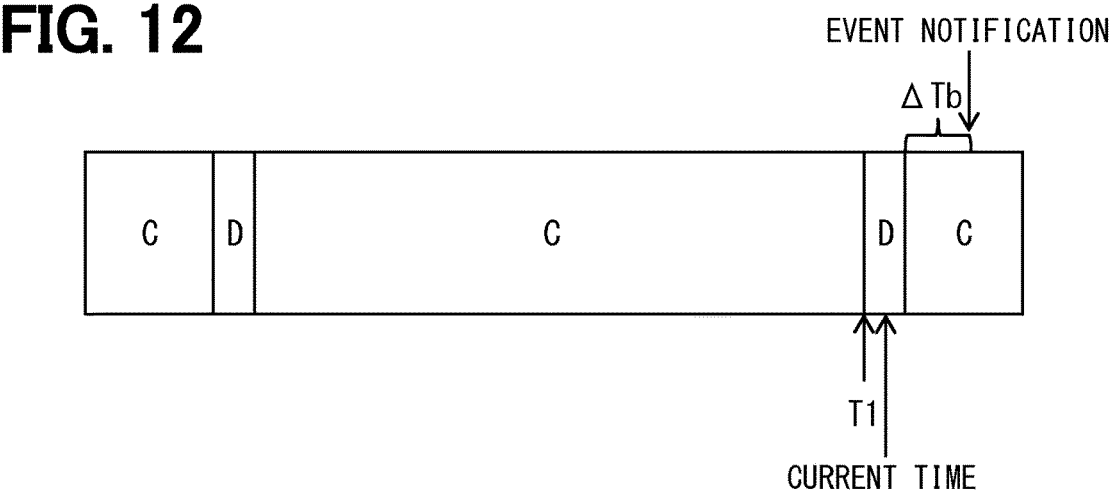
FIG. 12 is a diagram for explaining an example of the timing of event notification in a case where a sudden transmission timing and the period of the D-mode overlap.

In step S82, as shown in FIG. 12, at a time ΔTb [msec] after the start time of the next C-mode, the event notification is provided to the event trigger detection unit 212, and the process of the flowchart of FIG. 11 is ended.

When the sudden transmission timing overlaps the time duration of the D-mode, the signal to be transmitted from the RF module 21 according to the sudden transmission event fails to be transmitted within the period of the D-mode. On the other hand, with the process of S82, the signal to be transmitted from the RF module 21 according to the sudden transmission event is transmitted within the time duration of the next C-mode.

In step S83, the event notification is not provided to the event trigger detection unit 212, and the process of the flowchart of FIG. 11 is ended. When the event management unit 222 does not provide the event notification, the event trigger detection unit 212 operates the service function unit 213 immediately after the event trigger for the sudden transmission event is detected. Therefore, within the C-mode being the current mode, the signal to be transmitted from the RF module 21 can be transmitted.

Further, when the direct communication and the indirect communication using the same communication system can be performed in parallel, it is preferable that a transmission timing determined in accordance with the occurrence timing of a transmission event for transmission by the indirect communication (hereinafter, referred to as an indirect transmission event) is also shifted out of the time duration of the D-mode and the signal is transmitted from the RF module 21. This is based on an idea that, in the direct communication and the indirect communication using the same communication system, the transmission of the signal to the center 5 in the indirect communication cannot be performed within the time duration of the D-mode. The indirect transmission event includes a transmission event for transmitting information indicating that the host vehicle is inoperable to the center 5, etc.

For example, the contention determination unit 221 may determine whether or not the transmission timing of the signal from the RF module 21 determined in accordance with the occurrence timing of an indirect transmission event (hereinafter, referred to as the indirect transmission timing) overlaps the time duration of the D-mode, in the same manner as described above. When the contention determination unit 221 determines that the indirect transmission timing overlaps the time duration of the D-mode, the event management unit 222 may transmit the signal from the RF module 21, by shifting the indirect transmission timing out of the time duration of the D-mode. On the other hand, when the contention determination unit 221 determines that the indirect transmission timing does not overlap the time duration of the D-mode, the event management unit 222 may be configured not to perform the event notification. Thus, when the contention determination unit 221 determines that the transmission timing determined in accordance with the occurrence timing of the indirect transmission event overlaps the time duration of the D-mode overlap, the data transmission unit 202 transmits the signal from the RF module 21, by shifting the transmission timing out of the time duration of the D-mode.

Aspects of Embodiment 1

According to the configuration of Embodiment 1, the mode management unit 203 manages whether the RF module 21 is in the D-mode for searching for a different terminal device communicable or the C-mode for performing communication. Therefore, by using the information managed by the mode management unit 203, the contention determination unit 221 can determine whether or not the transmission timing of the signal from the RF module 21 determined in accordance with the occurrence timing of the transmission event to be transmitted from the RF module 21 overlaps the time duration of the D-mode. Based on determining that the transmission timing does not overlap the time duration of the D-mode, the signal is transmitted from the RF module 21 at this transmission timing, so that the signal can be transmitted at a timing that does not overlap the time duration of the D-mode. Further, when it is determined that the transmission timing overlaps the time duration of the D-mode, the signal is transmitted from the RF module 21 by shifting its transmission timing out of the time duration of the D-mode, so that the signal can be transmitted at a timing that does not overlap the time duration of the D-mode. As a result, in the mobile communication performable terminal device 2, it is possible to suppress the occurrence of a situation in which a signal to be transmitted cannot be transmitted.

According to the configuration of Embodiment 1, it is possible to suppress, with respect to both the periodic transmission event and the sudden transmission event, the occurrence of a situation in which a signal to be transmitted cannot be transmitted.

Embodiment 2

In Embodiment 1, when the contention determination unit 221 determines whether or not the next cycle transmission timing for the periodic transmission event overlaps the D-mode, the event management unit 222 performs processing for the periodic transmission event based on whether the current mode is the C-mode or the D-mode. However, the present disclosure is not limited thereto. For example, when it is determined with the periodic transmission event whether or not the next cycle transmission timing overlaps the time duration of the next D-mode, the event management unit 222 may be configured to provide an event notification to the event trigger detection unit 212 ΔTb [msec] after the start time of the next C-mode, regardless of whether or not the current mode is the C-mode or the D-mode.

Embodiment 3

In Embodiment, when the next cycle transmission timing overlaps the time duration of the next D-mode and the current mode is the C-mode, the event management unit 222 provides an event notification to the event trigger detection unit 212 ΔTa before the start time of the next D-mode. However, the present disclosure is not limited thereto.

For example, even when the next cycle transmission timing overlaps the time duration of the next D-mode and the current mode is the C-mode, if a time period from the current time to the start time of the next D-mode is less than ΔTa, the event management unit 222 may provide an event notification to the event trigger detection unit 212 ΔTb after the start time of the next C-mode. According to this, it is possible to transmit with higher accuracy the signal from the RF module 21 at a timing shifted out of the time duration of the D-mode.

Embodiment 4

In Embodiment 1, when the transmission timing of the signal from the RF module 21 determined in accordance with the occurrence timing of the transmission event to be transmitted from the RF module 21 overlaps the time duration of the D-mode, the signal is transmitted from the RF module 21 such that the transmission timing is shifted out of the time duration of the D-mode. However, the present disclosure is not limited thereto. For example, when the transmission timing overlaps the time duration of the D-mode overlap with each other, the processing to transmit the signal from the RF module 21 by shifting the transmission timing out of the time duration of the D-mode may be selectively performed according to the type of the transmission event, as described in Embodiment 4 below.

Now, Embodiment 4 of the present disclosure will be described with reference to the drawings. The communication system 1 of Embodiment 4 is the same as the communication system 1 of Embodiment 1 except that the terminal device 2 includes a communication control device 20a instead of the communication control device 20.

Figure 13:
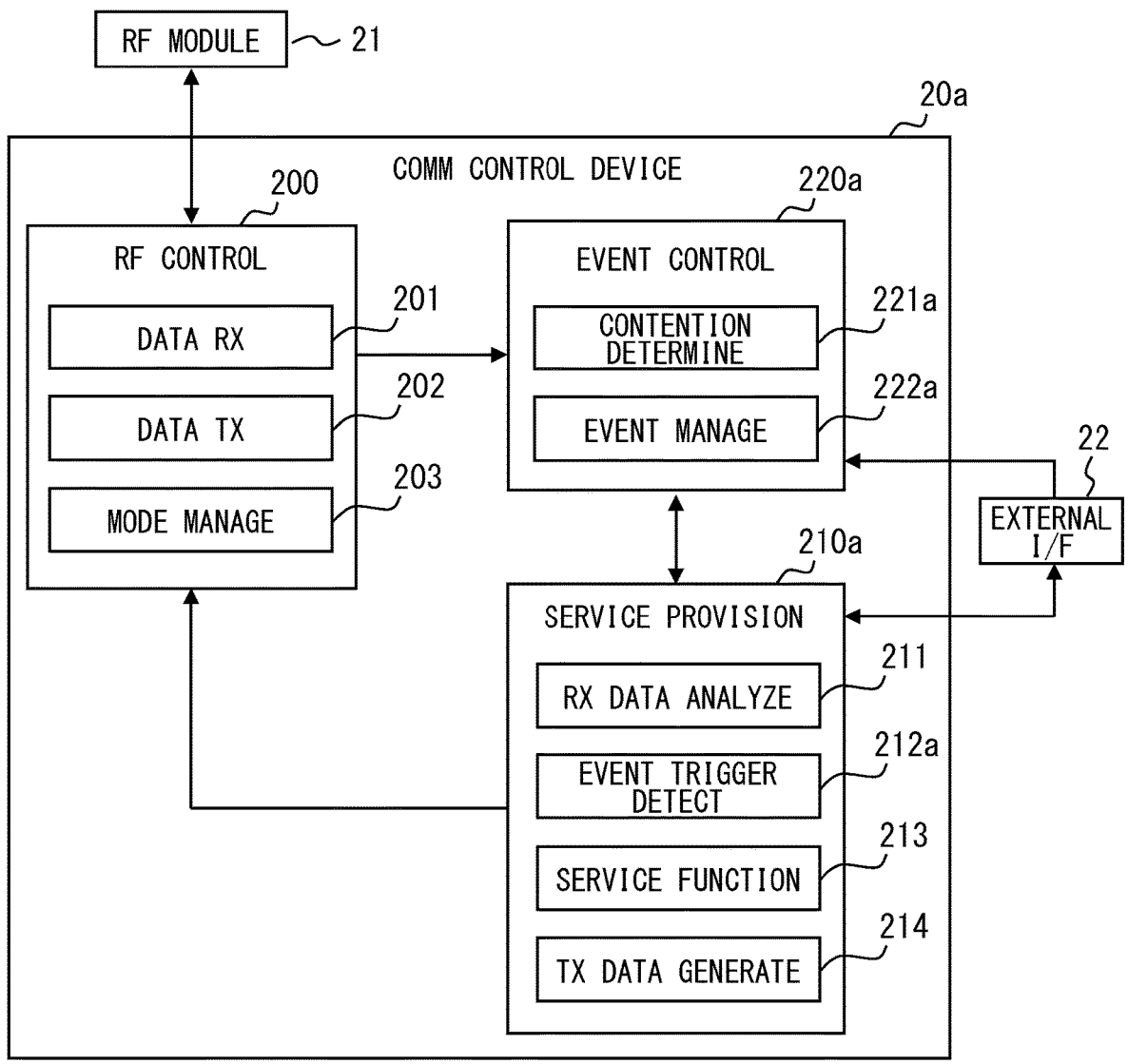
FIG. 13 is a diagram showing an example of a schematic configuration of the communication control device.

As shown in FIG. 13, the communication control device 20a includes an RF control unit 200, a service providing unit 210a, and an event control unit 220a as functional blocks. The communication control device 20a is the same as the communication control device 20 of Embodiment 1, except that a service providing unit 210a and an event control unit 220a are provided instead of the service providing unit 210 and the event control unit 220.

As shown in FIG. 13, the service providing unit 210a includes a reception data analysis unit 211, an event trigger detection unit 212a, a service function unit 213, and a transmission data generation unit 214 as sub-functional blocks. The service providing unit 210a is the same as the service providing unit 210 of Embodiment 1, except that an event trigger detection unit 212a is provided instead of the event trigger detection unit 212.

The event trigger detection unit 212a detects an event trigger of a transmission event to be transmitted from the RF module 21, similarly to the event trigger detection unit 212 of Embodiment 1. The event trigger detection unit 212a also detects as an event trigger an event notification from the event management unit 222a, which will be described later.

Further, the event trigger detection unit 212a identifies the type of the transmission event of the detected event trigger. Specifically, the event trigger detection unit 212a identifies whether the transmission event is of high urgency (hereinafter, referred to as a high urgency event) or low urgency (hereinafter, referred to as a low urgency event). The event trigger detection unit 212a corresponds to a determination unit. The high urgency event includes a transmission event related to service of the safety system. The low urgency event includes a transmission event related to service of the convenience and comfort system such as provision of entertainment and the like.

As shown in FIG. 13, the event control unit 220a includes a contention determination unit 221a and an event management unit 222a as sub-functional blocks.

With respect to the transmission event identified as the high urgency event by the event trigger detection unit 212a, the contention determination unit 221a determines whether or not the transmission timing of the signal from the RF module 21 determined in accordance with the occurrence timing of the transmission event overlaps the time duration of the D-mode, in the same manner as the contention determination unit 221 of Embodiment 1. On the other hand, with respect to the transmission event identified as the low urgency event by the event trigger detection unit 212a, the contention determination unit 221a does not determine whether or not the transmission timing of the signal from the RF module 21 determined in accordance with the occurrence timing of the transmission event overlaps the time duration of the D-mode.

The event management unit 222a notifies the event trigger detection unit 212a of the transmission event identified as the high urgency event by the event trigger detection unit 212a, based on the result of determining y the contention determination unit 221a, in the same manner as the event management unit 222 of Embodiment 1. On the other hand, the event management unit 222a does not notify the event trigger detection unit 212a of the transmission event identified as the low urgency event by the event trigger detection unit 212a. Therefore, with respect to the low urgency event, the signal is transmitted from the RF module 21 in accordance with the occurrence timing of the low urgency event. That is, regarding the transmission timing of the signal from the RF module 21 determined in accordance with the occurrence timing of the low urgency event, the data transmission unit 202 transmits the signal from the RF module 21 at this transmission timing, regardless of whether or not this transmission timing overlaps the time duration of the D-mode.

According to the configuration of Embodiment 4, it is possible to perform the process of shifting the transmission timing out of the time duration of the D-mode, only for the transmission event with high urgency. Therefore, for a transmission event with low urgency, it is possible to eliminate the waste resulting from performing a process of shifting the transmission timing in accordance with whether or not the transmission timing overlaps the time duration of the D-mode overlap, It should be noted that the present disclosure is not limited to the embodiments described above, and various modifications are possible within the spirit and scope of the present disclosure, and embodiments obtained by appropriately combining technical elements disclosed in different embodiments are also included in embodiments of the present disclosure. The control units and methods described in the present disclosure may be implemented by a special purpose computer created by configuring a memory and a processor programmed to execute one or more particular functions embodied in computer programs. Alternatively, the control units and methods described in the present disclosure may be implemented by a special purpose computer created by configuring a processor provided by one or more special purpose hardware logic circuits. Alternatively, the control units and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

What is claimed is:

1. A communication control device used in a terminal device that performs mobile communication,
the communication control device controlling a communication module included in the terminal device to perform direct communication with a different terminal device not via a base station,
the communication control device comprising:
a mode management unit that manages whether the communication module is in a search mode for searching for the different terminal device communicable or a communication mode for performing communication;
a contention determination unit that, using information managed by the mode management unit, determines whether or not a transmission timing of a signal from the communication module determined in accordance with an occurrence timing of a transmission event to be transmitted from the communication module overlaps a time duration of the search mode; and
a transmission control unit that
based on determining by the contention determination unit that the transmission timing does not overlap the time duration of the search mode, causes the communication module to transmit the signal at this transmission timing, and
when determining that the transmission timing overlaps the time duration of the search mode, shifts the transmission timing out of the time duration of the search mode and causes the communication module to transmit the signal;
wherein:
the mode management unit manages whether the communication module is in the search mode or the communication mode, the search mode and the communication mode being switched at set periods;
based on the information managed by the mode management unit, the set period, and a next occurrence timing of a periodic transmission event to be transmitted from the communication module, the contention determination unit predicts and determines whether or not the transmission timing of the signal from the communication module determined in accordance with the next occurrence timing overlaps the time duration of the search mode;
based on predicting and determining by the contention determination unit that the transmission timing does not overlap the time duration of the search mode, the transmission control unit causes the communication module to transmit the signal at this transmission timing;
when the contention determination unit predicts and determines that the transmission timing overlaps the time duration of the search mode, and a current mode specified from the information managed by the mode management unit is the communication mode, the transmission control unit shifts the transmission timing into a timing before start time of a next time duration of the search mode and causes the communication module to transmit the signal; and
when the contention determination unit predicts and determines that the transmission timing overlaps the time duration of the search mode, and the current mode specified from the information managed by the mode management unit is the search mode, the transmission control unit shifts the transmission timing into a next time duration of the communication mode and causes the communication module to transmit the signal.

2. The communication control device according to claim 1, wherein:
based on the information managed by the mode management unit and an occurrence timing of a sudden transmission event to be transmitted from the communication module, the contention determination unit determines whether or not the transmission timing of the signal from the communication module determined in accordance with this occurrence timing overlaps the time duration of the search mode; and
when the contention determination unit determines that the transmission timing overlaps the time duration of the search mode, the contention determination unit shifts the transmission timing into a next time duration of the communication mode and causes the communication module to the signal.

3. The communication control device according to claim 2, wherein
the communication control device is used in a vehicle, and
the sudden transmission event is a transmission event for transmitting information on an emergency situation occurring on the vehicle.

4. The communication control device according to claim 1, further comprising:
a determination unit that determines whether the transmission event is of high urgency or low urgency,
wherein:
in cases where the transmission event is determined as being of high urgency by the identification unit, the transmission control unit causes the communication module to transmit the signal such that
based on determining by the contention determination unit that the transmission timing of the signal from the communication module determined in accordance with the occurrence timing of the high urgency transmission event does not overlap the time duration of the search mode, the transmission control unit causes the communication module to transmit the signal at this transmission timing and
when the contention determination unit determines that the transmission timing of the signal from the communication module determined in accordance with the occurrence timing of the high urgency transmission event overlaps the time duration of the search mode, the transmission control unit shifts the transmission timing out of the search mode and causes the communication module to transmit the signal; and
in cases where the transmission event is determined as being of low urgency by the determination unit, the transmission control unit causes the communication module to transmit the signal such that
regardless of whether the transmission timing of the signal from the communication module determined in accordance with the occurrence timing of the low urgency transmission event overlaps the time duration of the search mode, the transmission control unit causes the communication module to transmit the signal at this transmission timing.

5. A terminal device that performs mobile communication, comprising:
a communication module that is capable of performing direct wireless communication with a different terminal device not via a base station, the different terminal device being other than the terminal device; and
a communication control device that controls the communication module,
the communication control device including:
a mode management unit that manages whether the communication module is in a search mode for searching for the different terminal device communicable or a communication mode for performing communication;
a contention determination unit that, using information managed by the mode management unit, determines whether or not a transmission timing of a signal from the communication module determined in accordance with an occurrence timing of a transmission event to be transmitted from the communication module overlaps a time duration of the search mode; and
a transmission control unit that
based on determining by the contention determination unit that the transmission timing does not overlap the time duration of the search mode, causes the transmission module to transmit the signal at this transmission timing, and
when the contention determination unit determines that the transmission timing overlaps the time duration of the search mode, shifts the transmission timing out of the time duration of the search mode and causes the communication module to transmit to the signal;
wherein:
the mode management unit manages whether the communication module is in the search mode or the communication mode, the search mode and the communication mode being switched at set periods;
based on the information managed by the mode management unit, the set period, and a next occurrence timing of a periodic transmission event to be transmitted from the communication module, the contention determination unit predicts and determines whether or not the transmission timing of the signal from the communication module determined in accordance with the next occurrence timing overlaps the time duration of the search mode;
based on predicting and determining by the contention determination unit that the transmission timing does not overlap the time duration of the search mode, the transmission control unit causes the communication module to transmit the signal at this transmission timing;
when the contention determination unit predicts and determines that the transmission timing overlaps the time duration of the search mode, and a current mode specified from the information managed by the mode management unit is the communication mode, the transmission control unit shifts the transmission timing into a timing before start time of a next time duration of the search mode and causes the communication module to transmit the signal; and
when the contention determination unit predicts and determines that the transmission timing overlaps the time duration of the search mode, and the current mode specified from the information managed by the mode management unit is the search mode, the transmission control unit shifts the transmission timing into a next time duration of the communication mode and causes the communication module to transmit the signal.

6. A communication control method used in a terminal device that performs mobile communication,
the communication control method controlling a communication module included in the terminal device to perform direct communication with a different terminal device not via a base station, the different terminal device being other than the terminal device, the communication control method comprising:

managing whether the communication module is in a search mode for searching for the different terminal device communicable or a communication mode for performing communication;

by using information managed, determining whether or not a transmission timing of a signal from the communication module determined in accordance with an occurrence timing of a transmission event to be transmitted from the communication module overlaps a time duration of the search mode;

based on determining that the transmission timing does not overlap the time duration of the search mode, casing the communication module to transmit the signal at this transmission timing;

based on determining that the transmission timing overlaps the time duration of the search mode, shifting the transmission timing out of the time duration of the search mode and causing the communication module to transmit the signal;

managing whether the communication module is in the search mode or the communication mode, the search mode and the communication mode being switched at set periods;

based on the information managed by the mode management unit, the set period, and a next occurrence timing of a periodic transmission event to be transmitted from the communication module, predicting and determining whether or not the transmission timing of the signal from the communication module determined in accordance with the next occurrence timing overlaps the time duration of the search mode;

based on predicting and determining by the contention determination unit that the transmission timing does not overlap the time duration of the search mode, causing the communication module to transmit the signal at this transmission timing;

upon determining the transmission timing is predicted and determined to overlap the time duration of the search mode, and a current mode is specified as the communication mode, shifting the transmission timing into a timing before start time of a next time duration of the search mode and causing the communication module to transmit the signal; and upon determining the transmission timing is predicted and determined to overlap the time duration of the search mode, and the current mode is specified as the search mode, shifting the transmission timing into a next time duration of the communication mode and causing the communication module to transmit the signal.

7. A non-transitory storage medium storing a control program causing a computer to function as a communication control device that is used in a terminal device which performs mobile communication, and that controls a communication module included in the terminal device to perform direct wireless communication with a different terminal device not via a base station, the control program causing the computer to perform:

managing whether the communication module is in a search mode for searching for the different terminal device communicable or a communication mode for performing communication;

by using information managed, determining whether or not a transmission timing of a signal from the communication module determined in accordance with an occurrence timing of a transmission event to be transmitted from the communication module overlaps a time duration of the search mode;

based on determining that the transmission timing does not overlap the time duration of the search mode, casing the communication module to transmit the signal at this transmission timing;

when determining that the transmission timing overlaps the time duration of the search mode, shifting the transmission timing out of the time duration of the search mode and causing the communication module to transmit the signal;

managing whether the communication module is in the search mode or the communication mode, the search mode and the communication mode being switched at set periods;

based on the information managed by the mode management unit, the set period, and a next occurrence timing of a periodic transmission event to be transmitted from the communication module, predicting and determining whether or not the transmission timing of the signal from the communication module determined in accordance with the next occurrence timing overlaps the time duration of the search mode;

based on predicting and determining by the contention determination unit that the transmission timing does not overlap the time duration of the search mode, causing the communication module to transmit the signal at this transmission timing;

when the transmission timing is predicted and determined to overlap the time duration of the search mode, and a current mode is specified as the communication mode, shifting the transmission timing into a timing before start time of a next time duration of the search mode and causing the communication module to transmit the signal; and when the transmission timing is predicted and determined to overlap the time duration of the search mode, and the current mode is specified as the search mode, shifting the transmission timing into a next time duration of the communication mode and causing the communication module to transmit the signal.

* * * * *